(12) United States Patent
Chang et al.

(10) Patent No.: US 11,881,477 B2
(45) Date of Patent: Jan. 23, 2024

(54) DUMMY POLY LAYOUT FOR HIGH DENSITY DEVICES

(71) Applicant: Taiwan Semiconductor Manufacturing Co., Ltd., Hsin-Chu (TW)

(72) Inventors: Yung Feng Chang, Hsinchu (TW); Bao-Ru Young, Zhubei (TW); Yu-Jung Chang, Zhubei (TW); Tzung-Chi Lee, Banciao (TW); Tung-Heng Hsieh, Zhudong Township (TW); Chun-Chia Hsu, Kaohsiung (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 182 days.

(21) Appl. No.: 16/902,636

(22) Filed: Jun. 16, 2020

(65) Prior Publication Data

US 2021/0257351 A1    Aug. 19, 2021

Related U.S. Application Data

(60) Provisional application No. 62/978,443, filed on Feb. 19, 2020.

(51) Int. Cl.
*H01L 27/08* (2006.01)
*H01L 27/02* (2006.01)
(Continued)

(52) U.S. Cl.
CPC ........ *H01L 27/0207* (2013.01); *G06F 30/392* (2020.01); *G06F 30/398* (2020.01);
(Continued)

(58) Field of Classification Search
CPC ...... G06F 30/398; G06F 30/392; G06F 30/39; G06F 30/20; G06F 30/00; G06F 30/30
See application file for complete search history.

(56) References Cited

U.S. PATENT DOCUMENTS 10,599,130 B2 * 3/2020 Kim .................. G05B 19/4097
11,314,915 B2 * 4/2022 Kim ...................... G06F 30/392
(Continued)

FOREIGN PATENT DOCUMENTS

CN          107808869 A       3/2018

*Primary Examiner* — Anthony Ho
*Assistant Examiner* — David J Goodwin
(74) *Attorney, Agent, or Firm* — Eschweiler & Potashnik, LLC

(57) ABSTRACT

An array of poly lines on an active device area of an integrated chip is extended to form a dummy device structure on an adjacent isolation region. The resulting dummy device structure is an array of poly lines having the same line width, line spacing, and pitch as the array of poly lines on the active device area. The poly lines of the dummy device structure are on grid with the poly lines on the active device area. Because the dummy device structure is formed of poly lines that are on grid with the poly lines on the active device area, the dummy device structure may be much closer to the active device area than would otherwise be possible. The resulting proximity of the dummy device structure to the active device area improves anti-dishing performance and reduces empty space on the integrated chip.

20 Claims, 12 Drawing Sheets

(51) Int. Cl.
  *H01L 23/52*      (2006.01)
  *H01L 29/66*      (2006.01)
  *H01L 27/088*     (2006.01)
  *H01L 23/528*     (2006.01)
  *H01L 21/8234*    (2006.01)
  *G06F 30/392*     (2020.01)
  *G06F 30/398*     (2020.01)
  *G06F 119/02*     (2020.01)
  *G06F 119/22*     (2020.01)

(52) U.S. Cl.
  CPC ........... *H01L 21/823431* (2013.01); *H01L 21/823475* (2013.01); *H01L 21/823481* (2013.01); *H01L 27/0886* (2013.01); *H01L 29/66545* (2013.01); *G06F 2119/02* (2020.01); *G06F 2119/22* (2020.01)

(56) References Cited

U.S. PATENT DOCUMENTS

| | | | |
|---|---|---|---|
| 2015/0278420 A1* | 10/2015 | Ke | H01L 29/6681 |
| | | | 716/124 |
| 2017/0040313 A1 | 2/2017 | Chen et al. | |
| 2017/0287909 A1* | 10/2017 | Oh | H01L 23/528 |
| 2018/0151559 A1 | 5/2018 | Sio et al. | |
| 2018/0341735 A1* | 11/2018 | Chang | H01L 27/0886 |
| 2019/0019810 A1 | 1/2019 | Becker et al. | |
| 2019/0051765 A1 | 2/2019 | Cheng et al. | |
| 2019/0067097 A1 | 2/2019 | Wang et al. | |

* cited by examiner

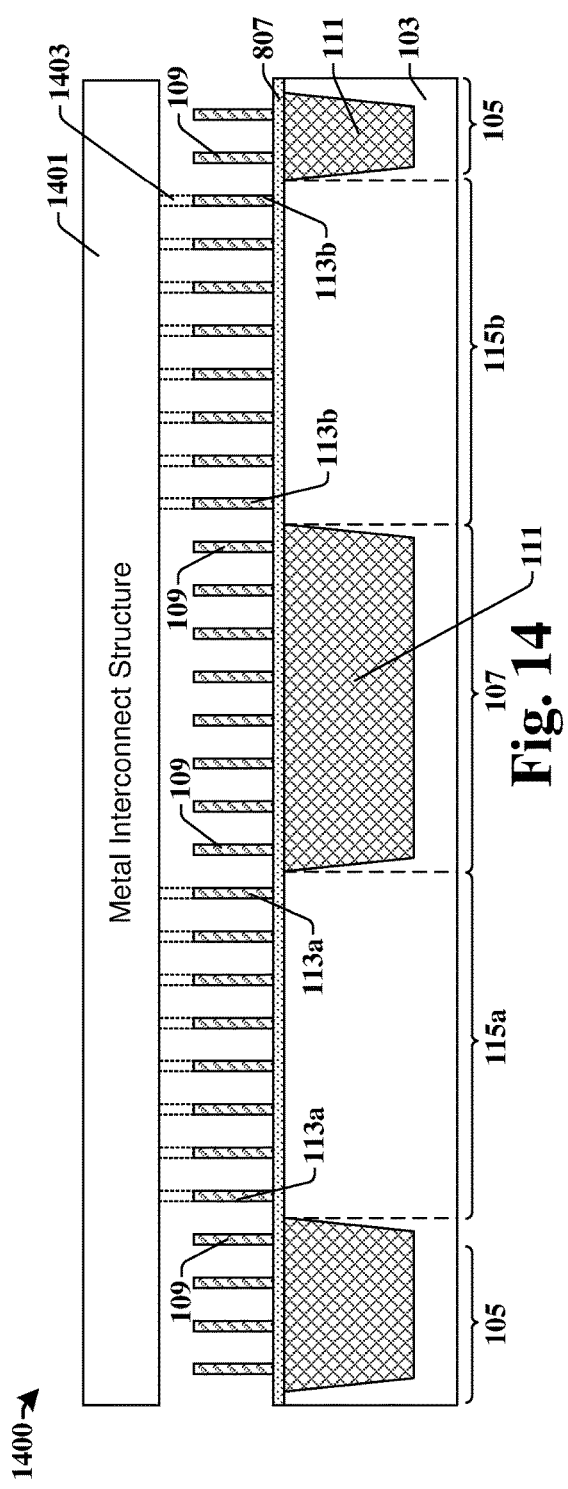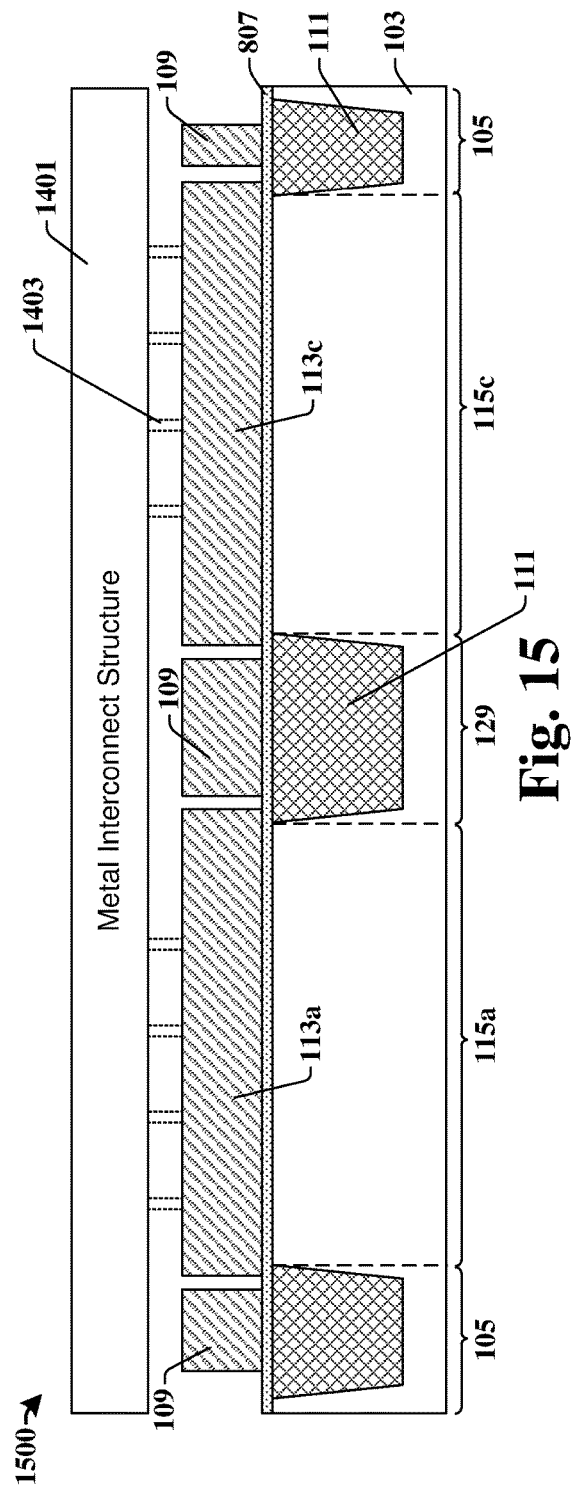

US 11,881,477 B2

DUMMY POLY LAYOUT FOR HIGH DENSITY DEVICES

REFERENCE TO RELATED APPLICATION

This Application claims the benefit of U.S. Provisional Application No. 62/978,443, filed on Feb. 19, 2020, the contents of which are hereby incorporated by reference in their entirety.

BACKGROUND

Integrated circuit layouts are constrained by design rules. These rules are developed in view of semiconductor manufacturing process capabilities and ensure proper functioning of devices, manufacturability, reliability, and acceptable yield. Some of these rules relate to proper spacing between structures in view of considerations such as electrical isolation and manufacturability. For example, a minimum spacing may be required between an active device structure and a dummy device structure that is formed on an adjacent isolation region. The dummy device structure may provide a function such as mitigation of dishing during chemical mechanical polishing (CMP). Space provided in accordance with these rules may consume a significant portion of a chip's area.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 14 illustrates a cross-sectional view along the line A-A' of FIG. 1.

FIG. 15 illustrates a cross-sectional view along the line B-B' of FIG. 1.

DETAILED DESCRIPTION

Figure 1:
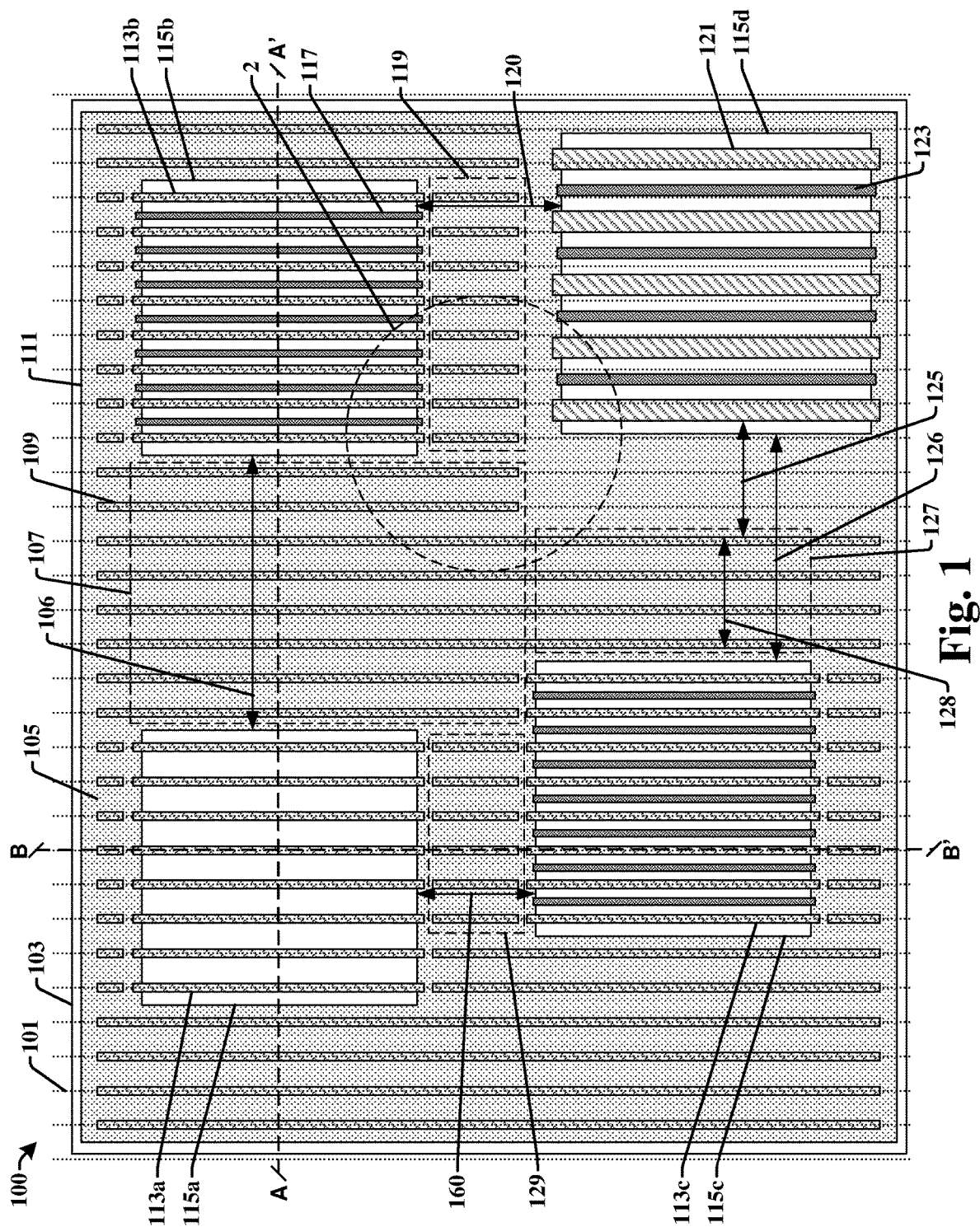
FIG. 1 is a plan view illustrating an integrated chip with dummy device structures in accordance with some embodiments of the present disclosure.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Some aspects of the present teachings relate to a method of designing an integrated chip. The method includes generating an integrated circuit layout file comprising an oxide definition mask and a first array of linear features. The oxide definition mask defines active device areas including a first active device area. The first array of linear features extends over the first active device area. According to the method, dummy fill inserted adjacent the first active device area is a second array of linear features having a same pitch as the first array of linear features and on grid with the first array of linear features. Making the dummy fill on grid with the first array allow the dummy fill to be closer to the first active device area than would otherwise be possible. Placing the dummy fill closer to the active device area improves anti-dishing performance and reduces empty space on the integrated chip. These effects are pronounced when the device has critical dimension corresponding to the 5 nm or smaller technology node.

Some aspects of the present teachings relate to an integrated chip in which a pattern defining a first array of linear features on an active device area is extended to form a second array of linear features that provides a dummy device structure on an adjacent non-active area of the device. The non-active area of the device includes an isolation structure that bounds the active device area. The linear features in the first array may have the same line width, line spacing, and pitch as the linear features in the first array. The position of a linear feature in the first array in combination with the pitch may be used to specify a grid. The linear features in the second array are on grid with the linear features of the first array.

In some embodiments, the dummy device structure, or a portion thereof, is to one side of the linear features in the first array. In some embodiments, the dummy device structure on that one side is spaced from the first array by only the line spacing. In such cases, the dummy device structure may be distinguished from one or two dummy elements at the end of the first array by the size of the dummy device structure. In some embodiments, the dummy device structure on that one side comprises eight or more of the linear features. In some embodiments, the dummy device structure on that one side is one eight or more the width of the first array. In some embodiments, the dummy device structure on that one side is one fourth or more the width of the first array. In some embodiments, the dummy device structure includes linear features aligned end-to-end with linear features in the first array. In some embodiments, the dummy device structure includes both linear features extending to one side of the linear features in the first array and linear features extending aligned end-to-end with linear feature in the first array.

In some embodiments, the dummy device structure is disposed between a first active device area and a second active device area. The first active device area and the second active device area are separated by a distance. The dummy device structure occupies a substantial portion of the distance between the first active device area and the second active device area. A substantial portion of the distance is at least one eighth of the distance. In some embodiments, the dummy device structure spans one fourth or more of the distance. In some embodiments, the dummy device structure spans half or more of the distance. The dummy device structure comprises four or more of the linear features. In some embodiments, the dummy device structure comprises eight or more of the linear features.

The dummy device structure may have a size comparable to that of the first or second active device area. In some embodiments, the dummy device structure spans a portion of the distance between the first active device area and the second active device area equaling one eight or more a width of the first active device area. In some embodiments, the dummy device structure spans a portion of the distance equaling one fourth or more a width of the first active device area. In some embodiments, the dummy device structure spans a portion of the distance equaling one half or more a width of the first active device area.

When used to describe a physical structure, a line is a linear feature having a finite length that is much greater than its width, which is also finite. When used to describe a virtual structure, a line is a geometrical line having infinite length and no width. A grid as used in the present disclosure is a virtual structure composed of evenly spaced parallel geometrical lines. An array of linear features is on grid if there exists a grid having a line spacing no greater than a pitch of the array and grid lines that are parallel to the linear features, wherein the grid can be positioned such that each of the linear features in the array lies over a single one of the grid lines.

An array of linear features has a fixed pitch from one linear feature to the next from one side of the array to an opposite side of the array. The linear features in the array need not all be of the same length. The "linear features" of this disclosure may refer to what are known in the art as "poly lines". Poly lines are conductive features that are formed over the semiconductor substrate and underneath a metal interconnect structure. In some embodiments, the poly lines are formed over the surface of the semiconductor substrate and are subject to chemical mechanical polishing at a stage of integrated chip manufacture. Poly lines over an active device area may provide word lines or gate strips. In some embodiments, at least some of the poly lines in the active device area operate as electrodes for transistors formed over the semiconductor substrate. In some embodiments, the transistors comprise fin field effect transistors (finFETs), which are commonly used at the 5 nm technology node. In some embodiments, the poly lines are formed of polysilicon. Alternatively, the poly lines may be formed of a different conductive material such as a metal, a metal silicide, a metal nitride, or the like.

Some aspects of the present teachings relate to an integrated chip that includes a semiconductor substrate having an active device area and a dummy device area. A first plurality of poly lines is disposed on the active device area. A dummy device structure is disposed on the dummy device area. In accordance with these teachings, the dummy device structure comprises a second plurality of poly lines that are on grid with the first plurality of poly lines. In some embodiments, the first plurality of poly lines and the second plurality of poly lines together form a continuous array of poly lines. In some embodiments, a portion of the first plurality of poly lines are aligned end-to-end with a portion of the second plurality of poly lines. In some embodiments, the first plurality of poly lines is an array of word lines formed crosswise over an array of semiconductor fins. In some embodiments, metal interconnect lines are disposed between adjacent members of the first plurality of poly lines. These latter features combine with dummy devices according to the present teaching to facilitate the provision of integrated chips at the 5 nm technology node.

Some aspects of the present teachings relate to an integrated chip that includes a first active device area, a second active device area, and a dummy device area that extends between the first active device area and the second active device area. A first array of linear features disposed over the first active device area has a first line spacing and a first line width. A second array of linear features disposed over the second active device area has a second line spacing and a second line width. A dummy device area extends between the first active device area and the second active device area. A dummy device structure disposed over the dummy device area extends over a substantial portion of the dummy device area. The dummy device structure is a third array of linear features having the first line spacing and the first line width. A substantial portion of the dummy device area is at least one eighth of the dummy device area. In some embodiments, the dummy device structure extends over one fourth or more of the dummy device area. In some embodiments, the dummy device structure extends over half or more of the dummy device area. The dummy device structure comprises four or more of the linear features. In some embodiments, the dummy device structure comprises eight or more of the linear features.

In some embodiments, a first portion of the linear features of the dummy device structure run parallel to the linear features of the first array and one of the linear features in the first portion is spaced from the first array by the first line width. In some embodiments, some of the linear features of the dummy device structure are aligned end-to-end with the linear features of the first array. In some embodiments, a first portion of the linear features of the dummy device structure run parallel to the linear features of the first array and a second portion of the linear features of the dummy device structure are aligned end-to-end with the linear features of the first array.

In some embodiments, the linear features in the first array and the linear features in the dummy device structure are disposed on a virtual grid of lines that have a pitch equal to a pitch of the linear features in the first array. In some embodiments, the second line spacing is distinct from the first line spacing, the second line width is distinct from the first line width and the dummy device structure is closer to the first array of linear features than to the second array of linear features. In some embodiments, the second line spacing equals the first line spacing and the second line width equals the first line width. In some of those embodiments, the dummy device structure spans a distance between the first active device area and the second active device area.

Some aspects of the present disclosure relate to a method of manufacturing an integrated chip. The method includes forming isolation structures on a semiconductor substrate to define a plurality of active device areas separated by a dummy device area. The dummy device area is that portion of the semiconductor substrate that is outside the active device areas. According to the method a continuous array of poly lines is formed on the semiconductor substrate. A first portion of the continuous array extends over one of the plurality of active device areas and a second portion of the continuous array extends over the dummy device area. The second portion constitutes a substantial portion of the continuous array of poly lines. An eighth or more would be a substantial portion. In some embodiments, one fourth or more of the continuous array is on the dummy device area.

In some embodiments, a portion of the poly lines are etched to divide individual poly lines into segments that extend over the active device areas and segments that form part of a dummy device. In some of these teachings, forming the continuous array of poly lines comprises double patterning.

In some of these teachings, one of the active device areas includes four sides that may be described as a left side, a right side, a top side, and a bottom side. In some of these teachings, dummy poly lines that are on grid with an array of poly lines extending over the active device area are disposed on two or more of the four sides. In some of these teachings, on grid dummy poly lines are disposed on all of the four sides. In some of these teachings, the active device area is surrounded by on-grid dummy poly lines. The on-grid dummy poly lines run parallel to the poly lines in the active device area on the left side or the right side or both the left side and the right side. The on-grid dummy poly lines align end-to-end with the poly lines in the active device area on the top side or the bottom side or the top side and the bottom side.

An arrangement of a dummy device structure according to the present disclosure is particularly useful for high-density devices. A high-density device may correspond to the 5 nm or smaller technology node. In some of these teachings, the array of poly lines has a line width to line spacing ratio in the range from about 0.12 to about 0.14, which is range suitable for high density devices. In some of these teachings, the poly lines are word lines for transistors. In some of these teachings, the word lines connect gates of FinFETs having fins that cross the word lines. FinFETs are often used in high density devices. In some of these teachings, zero level metal interconnect structures are disposed between adjacent poly lines in the arrays. Zero level metal interconnect structures are another feature often used in high density devices for which the present teachings are particularly pertinent.

Figure 2:
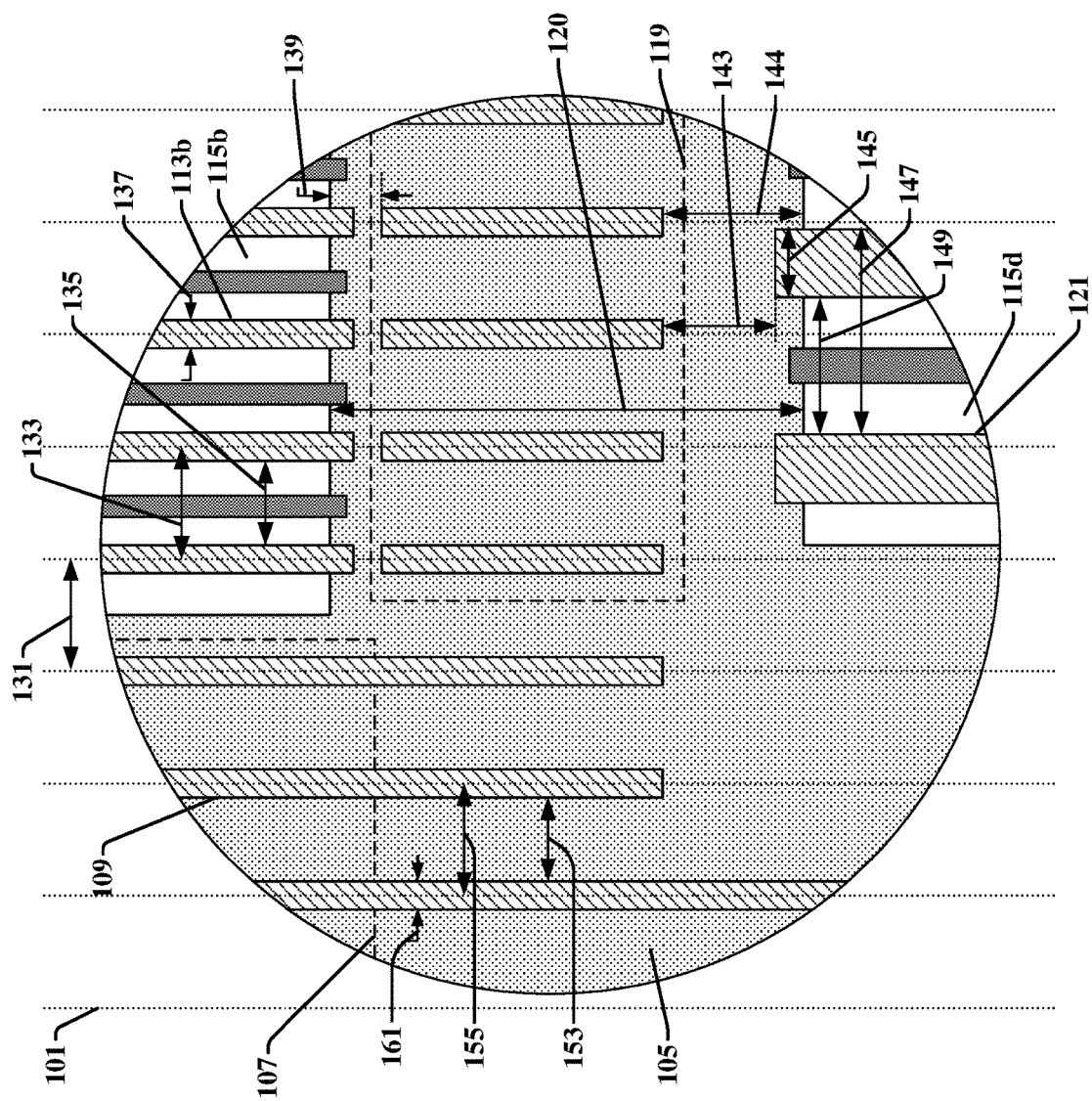
FIG. 2 is an enlarged view of the area 2 identified in FIG. 1.

FIG. 1 is a plan view of an integrated chip 100 according to some aspects of the present teachings. FIG. 2 is an enlarged view of the area 2 identified in FIG. 1. The integrated chip 100 includes a semiconductor substrate 103 divided into active device areas 115a-115d and a dummy device area 105. The boundaries of active device areas 115a-115d are determined by an isolation structure 111 formed in dummy device area 105. The active device areas 115a-115d may be referred to as oxide definition areas in that they are traditionally defined by a mask that blocks from those areas a process such as an oxidation process used to form an isolation structure across the inverse of active device areas 115a-115d, which is the dummy device area 105. Accordingly, the isolation structure 111 may cover the entire dummy device area 105. The isolation structure 111 may be any suitable isolation structure. A suitable isolation structure may be a shallow trench isolation (STI) structure, a field oxide of the type formed by local oxidation of silicon (LOCOS), or the like. In some embodiments, the isolation structure 111 is an STI structure. In some embodiments corresponding to the N5 technology node, the isolation structure 111 is composed of rectangular areas having a minimum size of approximately 0.3 μm by approximately 1 μm and these dimensions set minimum spacing between adjacent active device areas 115a-115d.

The semiconductor substrate 103 may be any type of semiconductor body (e.g., silicon, SiGe, SOI), such as a semiconductor wafer and/or one or more die on a wafer, as well as any other type of semiconductor and/or epitaxial layers, associated therewith. Suitable semiconductors for semiconductor substrate 103 may include silicon (Si), geranium (Ge), silicon geranium (SiGe), oxide semiconductors such as indium gallium zinc oxide (IGZO), Group III-V materials such as indium gallium arsenide (InGaAS), or the like. The active device areas 115a-115d of semiconductor substrate 103 may be doped to form deep n-wells, deep p-wells, or combinations thereof. The active device areas 115a-115d may comprise numerous devices (not shown) such as transistor devices. The transistor devices may be metal oxide semiconductor field effect transistors MOSFETs, bipolar junction transistors (BJTs), high electron mobility transistors (HEMTs), or the like. In some embodiments, the transistor devices include finFETs. In some embodiments, active device areas 115a-115c include devices of a size reflecting the 5 nm or a smaller scale technology node.

Arrays of linear features 113a-113c extend respectively over the active device areas 115a-115c. Most of the linear features 113a-113c are on their respective active device areas 115a-115c, but ends of the linear features 113a-113c may extend over edges of an active device area and an end of any of the arrays may extend beyond an edge of the respective active device area by one or two elements. The arrays typically include a much larger number of members than the number illustrated and one or two elements of an array are not enough to cover a substantial portion of a distance to an adjacent active device area. The linear features 113a-113c all have the same line width 137, line spacing 135, and pitch 133. Linear features 121 extending over active device area 115d, on the other hand, have a width 145, a spacing 149, and a pitch 147, all of which are greater than the those of the linear features 113a-113c. The linear features 113a-113c are all on a grid 101 that has a pitch 131 that equals the pitch 133 of the linear features 113a-113c.

Linear features 109 form a continuous array over dummy device area 105. The linear features 109 are on grid with the linear features 113a-113c and have a width 161, a spacing 153, and a pitch 155 that are the same as the line width 137, the line spacing 135, and the pitch 133 of linear features 113a-113c. The linear features 113a-113c and the linear features 109 are all made of the same material and may be poly lines. The linear features 121 may also be poly lines and may be of the same material as the linear features 113a-113c and the linear features 109.

Metal lines 117 are disposed over the semiconductor substrate 103 and between adjacent linear features 113b-113c in active device areas 115b-115c respectively. Metal lines 123 are disposed over the semiconductor substrate 103 and between adjacent linear features 121 in active device areas 115d. Metal lines 117 and 123 are zero level metal interconnect structures and may include connections with underlying source/drain regions (not shown) and an overlying metal interconnect structure (also not shown).

In some embodiments, a ratio of the line width 137 to the line spacing 135 is in the range from approximately 0.10 to approximately 0.20. In some embodiments, the ratio is in the range from approximately 0.12 to approximately 0.14. These latter dimensions are commonly used in the 5 nm technology node and may be associated with challenges to prevent dishing during CMP that are met by the structures and methods of the present disclosure.

The linear features 109 over dummy device area 105 form one large dummy device structure and smaller dummy device structures between adjacent active device areas 115a-115d. The linear features 109 form a dummy device structure 107 between the active device area 115a and the active device area 115b, a dummy device structure 119 between the active device area 115b and the active device area 115d, a dummy device structure 129 between the active device area 115a and the active device area 115c, and a dummy device structure 127 between the active device area 115c and the active device area 115d.

The linear features 109 in dummy device structure 107 are to a right side of the linear feature 113a in the active device area 115a and to a left side of the linear feature 113b in the active device area 115b. The dummy device structure 107 is spaced from each of the arrays of linear features 113a and linear features 113b by the line spacing 135 and spans essentially the entire distance 106 between the active device area 115a and the active device area 115b. The distance 106 is approximately the same as a distance between the array of linear features 113a and the array of linear features 113b. The linear features 113a in active device area 115a, the linear features 109 in dummy device structure 107, and the linear features 113b in active device areas 115b may all be formed from a single continuous array of evenly spaced linear features. This allows the distance 106 between active device area 115a and the active device area 115b to be as small as the narrowest dimension of a suitable isolation structure. Even with the distance 106 at that minimum, the dummy device structure 107 has a large number of the linear features 109. Eight are illustrated, but the actual number is typically much greater.

The linear features 109 in the dummy device structure 129 are aligned end-to-end with linear feature 113a in the active device area 115a and are also aligned end-to-end with linear feature 113c in the active device area 115c. Linear features 109 in dummy device structure 129 may have been formed by etching to form discontinuities in longer features that originally extended across the active device area 115a and the active device area 115c. The dummy device structure 129 spans a majority of a distance 160 between the active device area 115a and the active device area 115c. The distance 160 between active device area 115a and the active device area 115c may be limited only by the minimum dimension of a suitable isolation structure. The dummy device structure 129 and the dummy device structure 107 may be considered parts of one larger dummy device structure bordering two adjacent sides of the active device area 115a.

The linear features 109 in dummy device structure 119 are aligned end-to-end with linear feature 113b in the active device area 115b. The linear feature 109 in dummy device structure 119 may have been formed by etching to form discontinuities in longer features that originally extended across the active device area 115b. The dummy device structure 129 spans a majority of a distance 120 between the active device area 115c and the active device area 115d. The distance 160 between active device area 115a and the active device area 115b may be smaller than the distance 120 between active device area 115c and the active device area 115d. The distance 120 includes a distance 144 (see FIG. 2) between dummy device structure 119 and the linear features 121 that form an array over the active device area 115d. A minimum for the distance 144 results from a design rule in view of manufacturing process constraints. A distance 139 between the dummy device structure 119 and the active device area 115c may be less than the distance 144.

The linear features 109 in dummy device structure 127 are to one side of the linear features 113c in the active device area 115c and also to one side of the linear feature 121 in the active device area 115d. The dummy device structure 127 spans a distance 128 that is one fourth or more of a distance 126 between the active device area 115c and the active device area 115d. For ease of illustration, the dummy device structure 127 is illustrated with only four of the linear features 109. The dummy device structure 127 generally includes at least eight of the linear features 109 to provide a desired degree of protection against dishing during CMP of linear features 113c. The linear features 113c in active device area 115c and the linear features 109 in dummy device structure may be formed from a single continuous array of evenly spaced linear features. The dummy device structure 127 is spaced from the array of linear features 113c by the line spacing 135. On the other hand, the dummy device structure 127 is spaced from the array of linear features 121 in active device area 115d by a distance 125, which is much greater than the line spacing 135. A minimum for the distance 125 is set by design rules in view of manufacturing process constraints.

As shown by the cross-sectional view 1400 of FIG. 14, the isolation structure 111 surrounds the active device area 115a, surrounds the active device area 115b, and extends from the active device area 115a to the active device area 115b. The linear features 109 of the dummy device structure 107 are over the isolation structure 111 between the active device area 115a to the active device area 115b. The linear features 113a of the active device area 115a, the linear features 109 of the dummy device structure 107, and the linear features 113b of the active device area 115b form a single array having a constant pitch. A metal interconnect structure 1401 is over the linear features 109, 113a, and 113b. The metal interconnect structure 1401 is coupled to the linear features 113a and to the linear features 113b by connections 1403, but no connections couple the linear features 109 of the dummy device structure 107 to the metal interconnect structure 1401.

As shown by the cross-sectional view 1500 of FIG. 15, the isolation structure 111 surrounds the active device area 115a, surrounds the active device area 115c, and extends from the active device area 115a to the active device area 115c. The linear features 109 of the dummy device structure 129 are over the isolation structure 111 between the active device area 115a to the active device area 115c. The linear features 113a of the active device area 115a, the linear features 109 of the dummy device structure 129, and the linear features 113b of the active device area 115c are aligned end-to-end. A metal interconnect structure 1401 is over the linear features 109, 113a, and 113c. The metal interconnect structure 1401 is coupled to the linear features 113a and to the linear features 113c by connections 1403, but no connections couple the linear features 109 of the dummy device structure 129 to the metal interconnect structure 1401.

Figure 3:
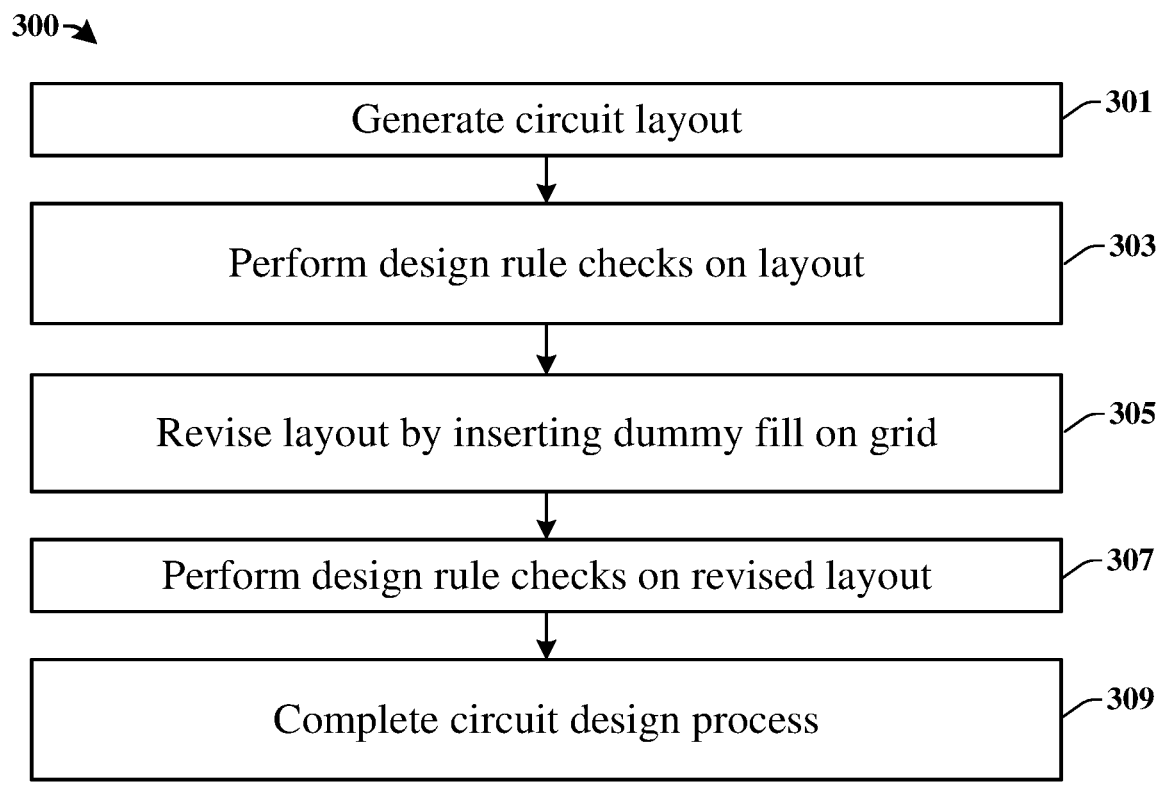
FIG. 3 is a flow chart of a computer-aided design process in accordance with some embodiments of the present disclosure.

FIG. 3 is a flow chart of a computer-aided design process 300 for forming an integrated chip design in accordance with some embodiments of the present disclosure. Act 301 is generating a circuit layout that specifies locations for one or more integrated circuit devices in one or more active device areas. The circuit layout may be represented in any computer-aided design format, for example, a format such as Library Exchange Format (LEF), Design Exchange Format (DEF), Milkyway database file format, SPICE file format, Circuit Description Language (CDL) file format, and Graphic Database System (GDSII) stream file format, or the like. Act 303 is checking the integrated chip design against a set of design rules to determine if there are any violations. If there is a violation, the chip design is revised before further processing.

Act 305 is revising the circuit layout by inserting dummy fill. In accordance with the present teachings, at least some of the dummy fill is provided by an array of linear features that are on grid with a previously specified array of linear features. The previously specified array of linear features extends over an active device area adjacent the dummy fill. In some embodiments, the dummy fill is inserted on two or more sides of the active device area. In some embodiments, the dummy fill is inserted on all sides of the active device area.

Act 307 is checking that that the revised circuit layout with the dummy fill satisfies the set of design rules. FIGS. 4A-4D illustrate some of these design rules in terms of active device/dummy device arrangement that may occur in the circuit layout. Common to all of these figures is an active device area 415 and an array 402 of linear features 413 formed on a grid 401. The array 402 extends over the active device area 415.

The array 402 includes a member 406 disposed beyond an edge 404 of the active device area 415. The member 406 may not support any active devices but is included in the circuit layout prior to the dummy fill insertion of Act 305. A potential reason for including the member 406 is satisfying a design rule that requires the array 402 to have an even number of the linear features 413. The array 402 is illustrated as having only eight of the linear features 413, but this is only for ease of illustration. A typical number in the array 402 is much higher. Although only one member 406 is shown beyond the edge 404 of the active device area 415, there may be two such members.

Figure 4A:
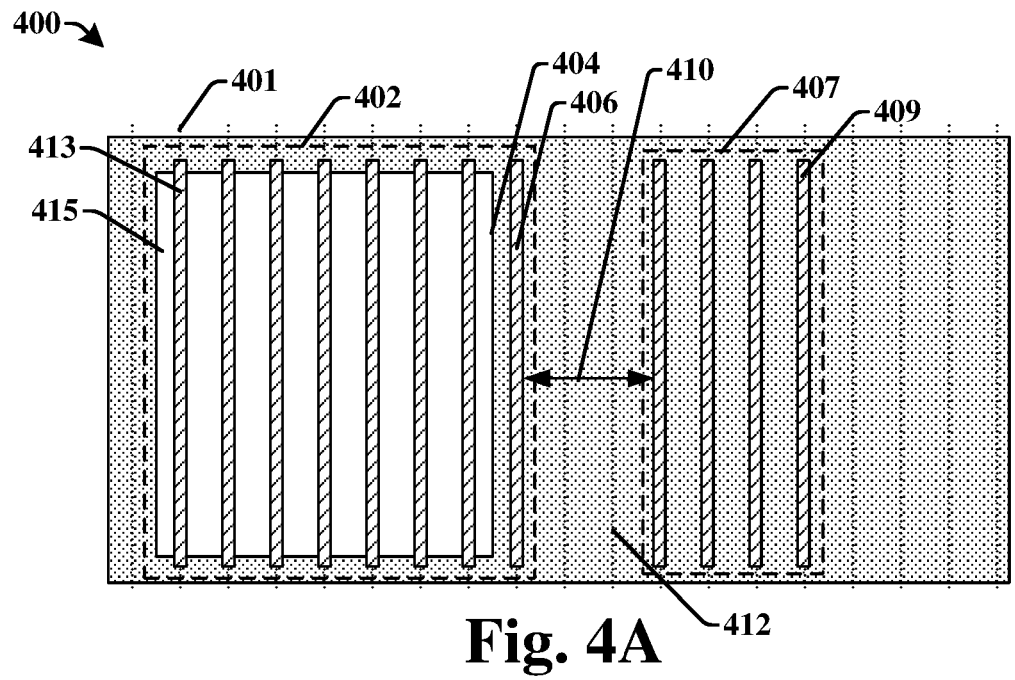
FIGS. 4A-4D illustrate design rules applied during the process of FIG. 3.

FIG. 4A provides a view 400 illustrating a dummy device 407 inserted adjacent the active area 415. The dummy device 407 is composed of linear features 409 that are on the same grid 401 as the linear features 413 of the array 402. In accordance with another design rule, the dummy device 407 has an even number of the linear features 409. The illustration shows the linear features 409 in the dummy device 407 numbering four, however, the dummy device 407 typically has a much greater number of the linear features 409.

In accordance with another design rule, the number of lines of grid 401 between the dummy device 407 and the array 402 is an even number. In this example, there are two grid lines 412 between the dummy device 407 and the array 402. With reference to FIG. 1, there are zero grid lines between the array of linear features 113a and the dummy device 107. That configuration also satisfies the design rule. The distance 410 between the dummy device 407 and the array 402 can be made as small as the spacing between the linear features 413 in the array 402, which is also the spacing between the linear feature 409 in the dummy device 407. In such a case, the member 406 may appear to be a part of the dummy device 407 in a device made according to the integrated chip design. If the distance 410 is larger than the spacing between the linear features 413, it is larger by an integer multiple of two times the pitch of the linear features 413.

Figure 4B:
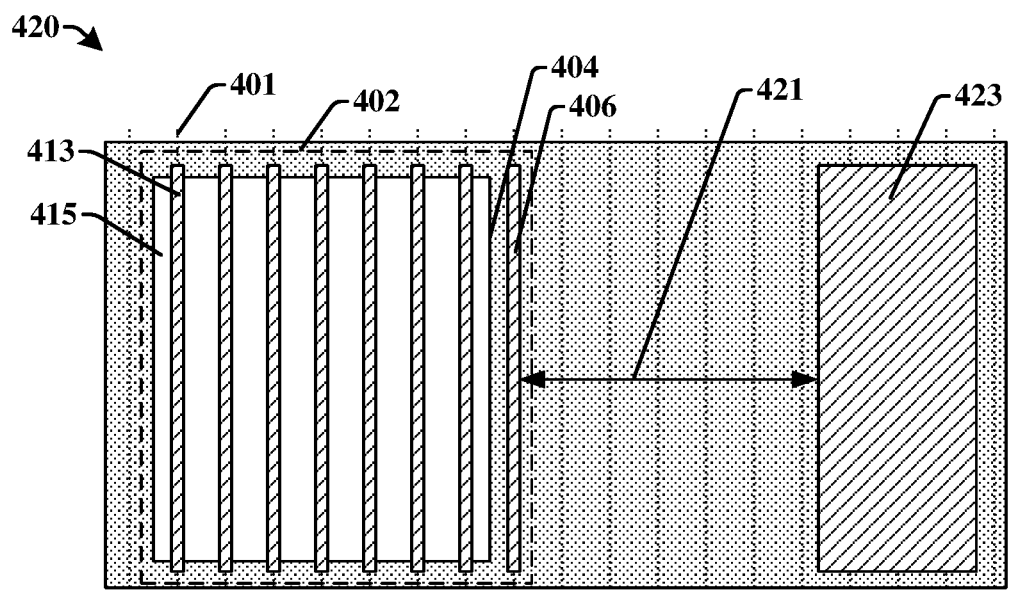

FIG. 4B provides a view 420 illustrating another dummy device 423 inserted adjacent the active area 415. The dummy device 423 is a solid block and is not on grid with respect to the linear features 413 in the array 402. A different design rule applies than for the case of FIG. 4A. This design rule requires a distance 421 between the dummy device 423 and the array 402 to be much larger than the distance 410 between the dummy device 423 and the array 402. For example, in the N5 technology node the distance 421 may be required to be at least about 150 nm. With reference to FIG. 1, this design rule would also apply to the distance 125.

Figure 4C:
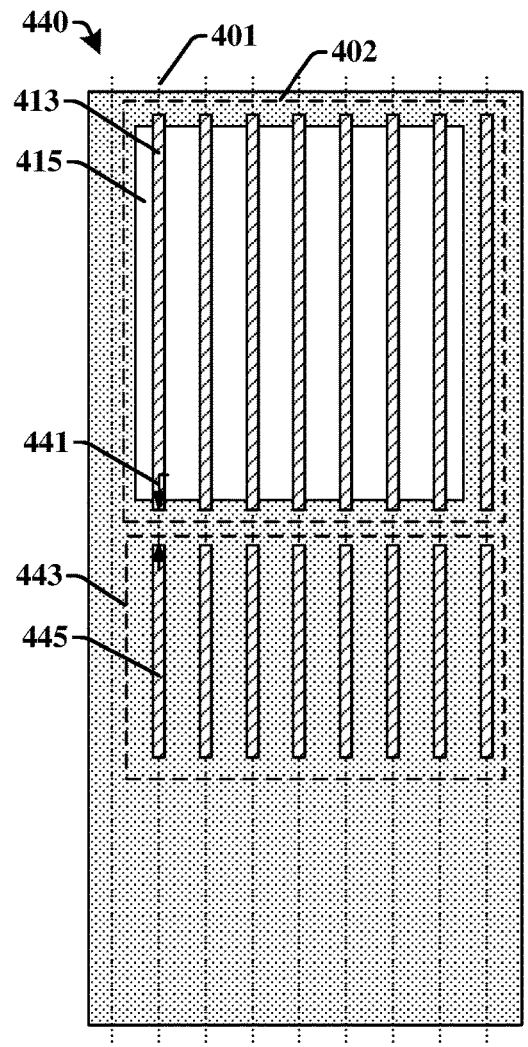

FIG. 4C provides a view 440 illustrating a dummy device 443 inserted adjacent the active area 415. The dummy device 443 is composed of linear features 445 that are on the same grid 401 and have the same width as the linear features 413 of the array 402. The linear features 445 are aligned end-to-end with the linear features 413. In accordance with a design rule that applies to this configuration, a distance 441 between the dummy device 443 and the array 402 can be as small as 25 nm for the N5 technology node. In accordance with another design rule, the dummy device 443 has an even number of the linear features 445.

Figure 4D:
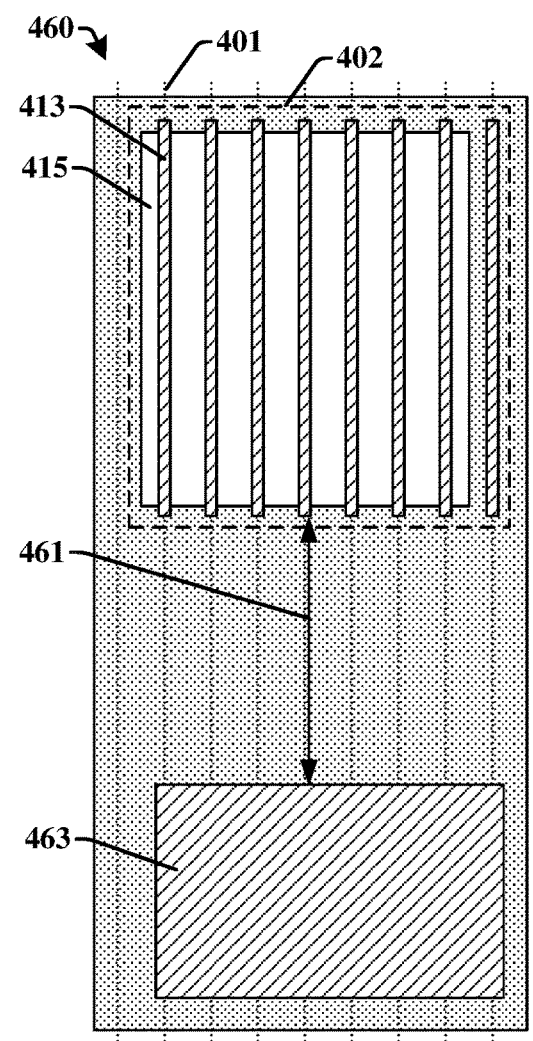

FIG. 4D provides a view 460 illustrating another dummy device 463 inserted adjacent the active area 415. The dummy device 423 is a solid block and is not on grid with respect to the linear features 413 in the array 402. A different design rule applies and requires a distance 421 between the dummy device 423 and the array 402 to be much larger than the distance 441. For example, in the N5 technology node the distance 421 may be required to be at least about 225 nm. With reference to FIG. 2, this design rule would also apply to the distance 143.

If the design rule checks of Act 307 are satisfied, the computer-aided design process 300 may continue with Act 309, completing the design process. Completing the design process may include adding a metal interconnect structure. The metal interconnect structure would not ordinarily include connections to any of the dummy devices 407, 423, 443, 463 or the member 406. These structures are not active device structures.

Figure 5:
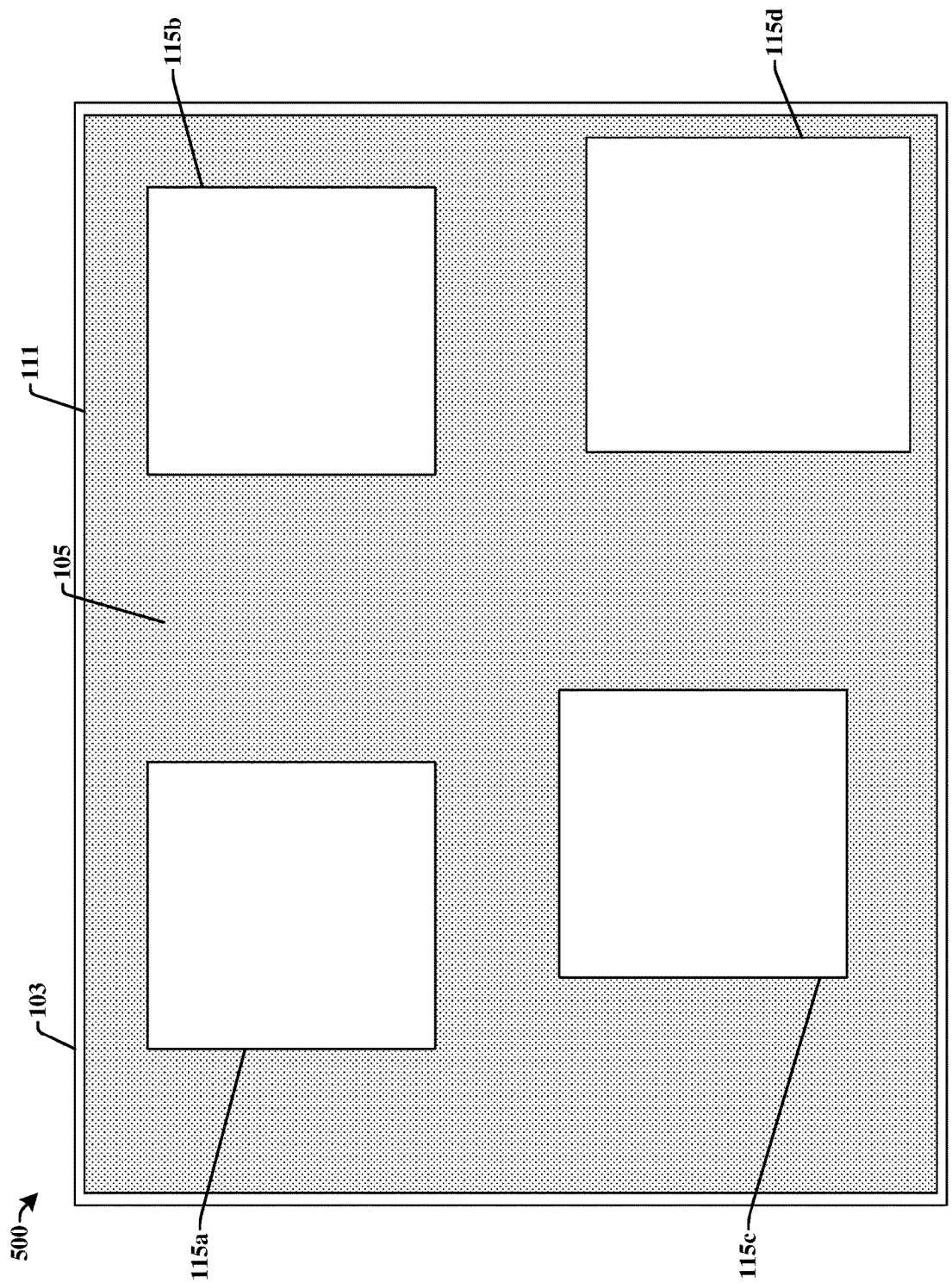
FIGS. 5-7 are a series of plan views illustrating a method of forming dummy device structures on an integrated chip in accordance with some embodiments of the present disclosure.
Figure 6:
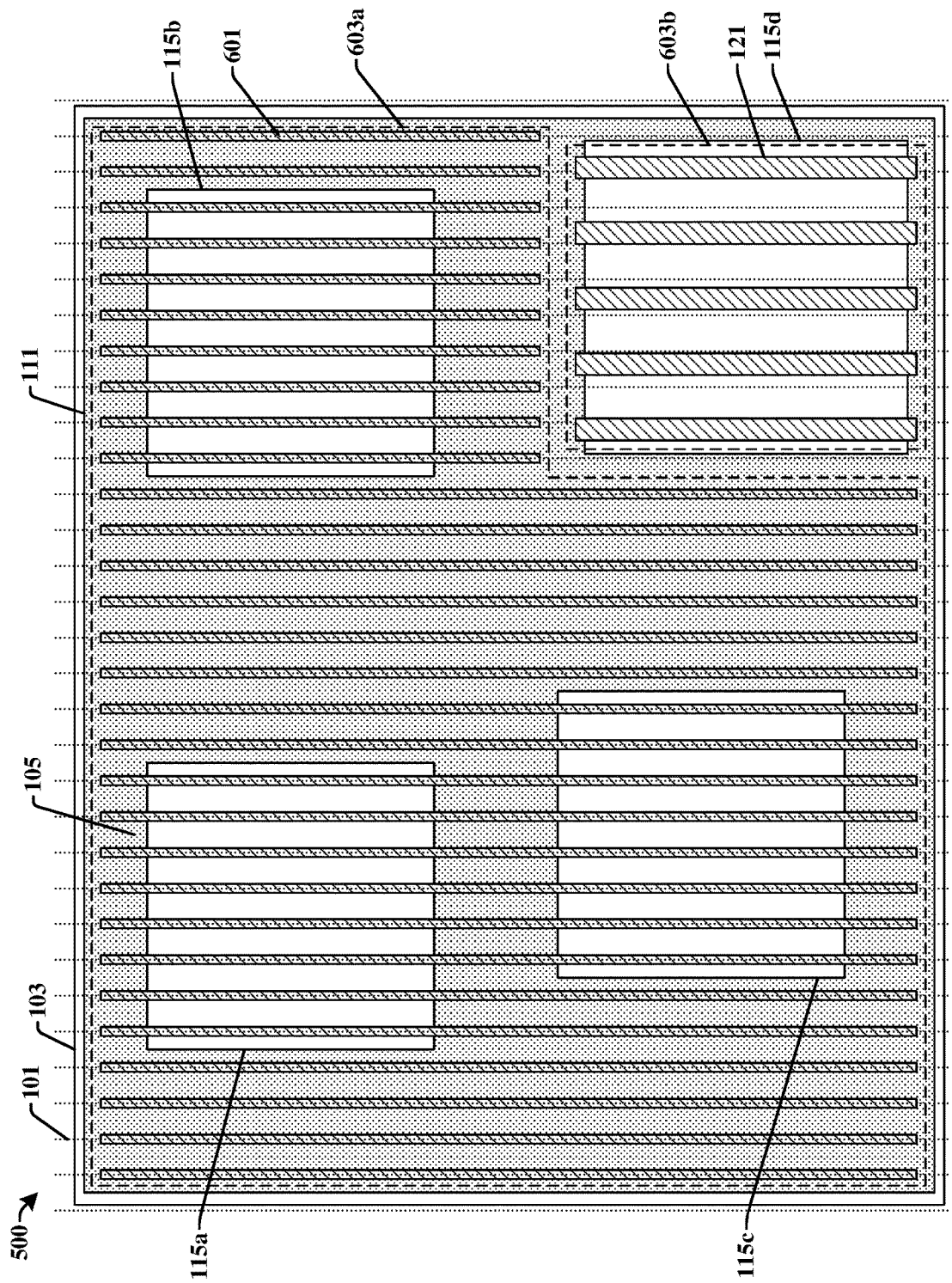
Figure 7:
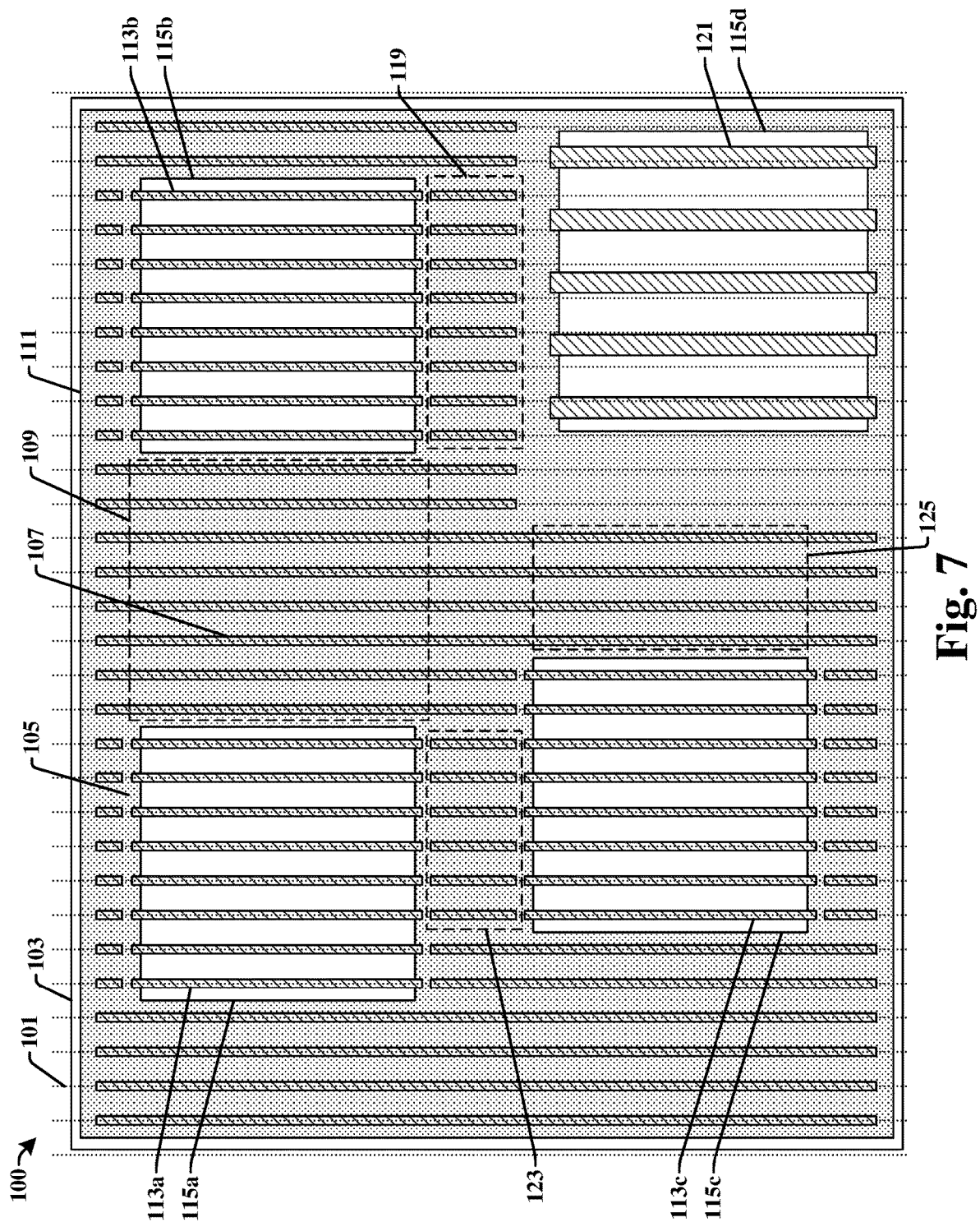

FIGS. 5-7 show cross-sectional views 500-700 illustrating a method of forming an integrated chip having dummy device structures in accordance with some embodiments of the present disclosure. Although FIGS. 5-7 are described in relation to a method, it will be appreciated that the structures disclosed in FIGS. 5-7 are not limited to such a method, but instead may stand alone as structures independent of the method. Furthermore, although FIGS. 5-7 illustrate particular structures and compositions, the method is readily extendable to other structures and compositions within the scope of this disclosure.

As shown in cross-sectional view 500 of FIG. 5, an isolation structure 111 is formed in the semiconductor substrate 103 to define the active device areas 115a-115d and the dummy device area 105. The isolation structure 111 surrounds the active device areas 115a-115d and may extend across the entire dummy device area 105. The active device areas 115a-115d may be doped with n-type or p-type dopants. Masking may be used to provide different doping types in different active device areas 115a-115d.

As shown in cross-sectional view 600 of FIG. 6, linear features 601 and linear features 121 are formed according to a pattern 603a and a pattern 603b respectively. Patterns 603a-603b each have a uniform line width and spacing, whereby the linear features 601 are all on a grid and the linear features 121 are all on another grid. The linear features 601 form a continuous array and the linear features 121 form another continuous array. Because these arrays are continuous and have uniform line width and spacing, they may be formed with a high feature density by any suitable process, including for example a double patterning process or the like. In some embodiments, there are an even number of the linear features 601.

As shown in cross-sectional view 700 of FIG. 7, an etching process can be carried out to define the linear features 113a-113c and the linear features 109 from the linear features 601. The etching process creates breaks along the lengths of linear features 601, creating electrical isolation between the linear features 113a-113c associated with active device areas 115a-115c and the linear features 109 of the dummy device structures 107, 119, 127, and 129. Forming these breaks facilitates making the end-to-end spacings between linear features 113a-113c and the linear features 109 small, however, these breaks may alternatively be introduced by the masking and etching that forms the linear features 601. Metal lines 117 and 123 may be formed on the structure shown in cross-sectional view 700 of FIG. 7 to produce an integrated chip 100 as shown in FIG. 1.

FIGS. 8-12 show cross-sectional views 800-1200 illustrating a spacer double patterning method, which is one of many possible alternatives for forming an array of linear features 601 as shown in cross-sectional view 600 of FIG. 6. Although FIGS. 8-12 are described in relation to a method, it will be appreciated that the structures disclosed in FIGS. 8-12 are not limited to such a method, but instead may stand alone as structures independent of the method. Furthermore, although FIGS. 8-12 illustrate particular structures and compositions, the method is readily extendable to other structures and compositions within the scope of this disclosure.

Figure 8:
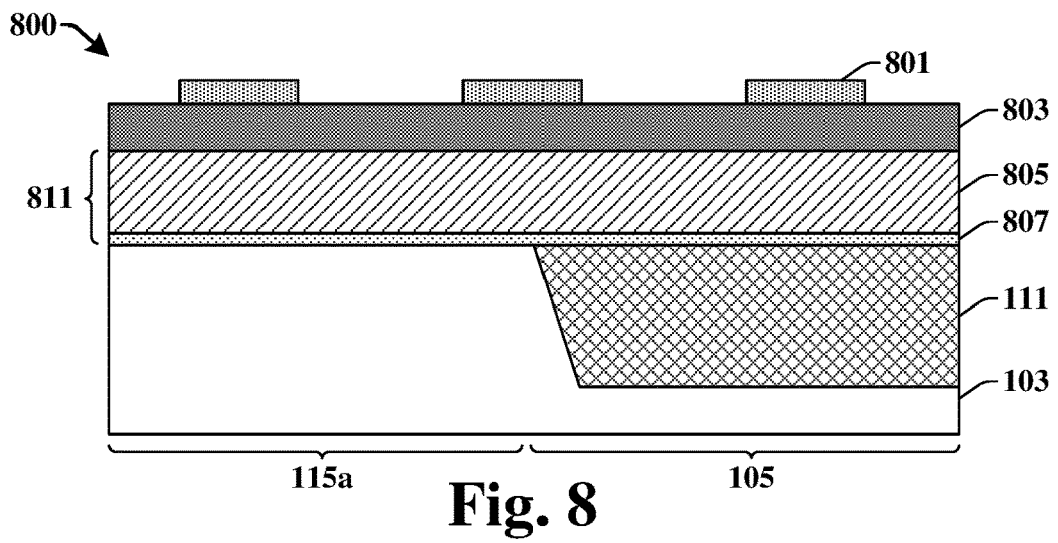
FIGS. 8-12 are a series of cross-sectional views illustrating a method of forming dummy device structures on an integrated chip in accordance with some embodiments of the present disclosure including an example double patterning process.

As shown by the cross-sectional view 800 of FIG. 8, an isolation structure 111 may be formed in the semiconductor substrate 103. The area of the semiconductor substrate 103 that includes the isolation structure 111 is part of the dummy device area 105. The remaining area of the semiconductor substrate 103 as shown in the cross-sectional view 800 of FIG. 8 may correspond to the active device area 115a. Semiconductor fins (not shown) may be formed on the semiconductor substrate 103. If such fins are present the cross-sectional view 800 of FIG. 8 runs parallel to those fins.

As further shown by the cross-sectional view 800 of FIG. 8, a gate stack 811 may be formed over the semiconductor substrate 103. The gate stack 811 may include a dielectric layer 807, a polysilicon layer 805, or some other layer or combination of layers. In accordance with the double patterning method, a hard mask layer 803 is formed over the gate stack 811 and a patterned mask 801 is formed over the hard mask layer 803. The patterned mask 801 may be a photoresist mask patterned using a photolithographic process. In some embodiments, the photolithographic process uses extreme ultraviolet (EUV) light. EUV photolithography may be part of the 5 nm technology node.

Figure 9:
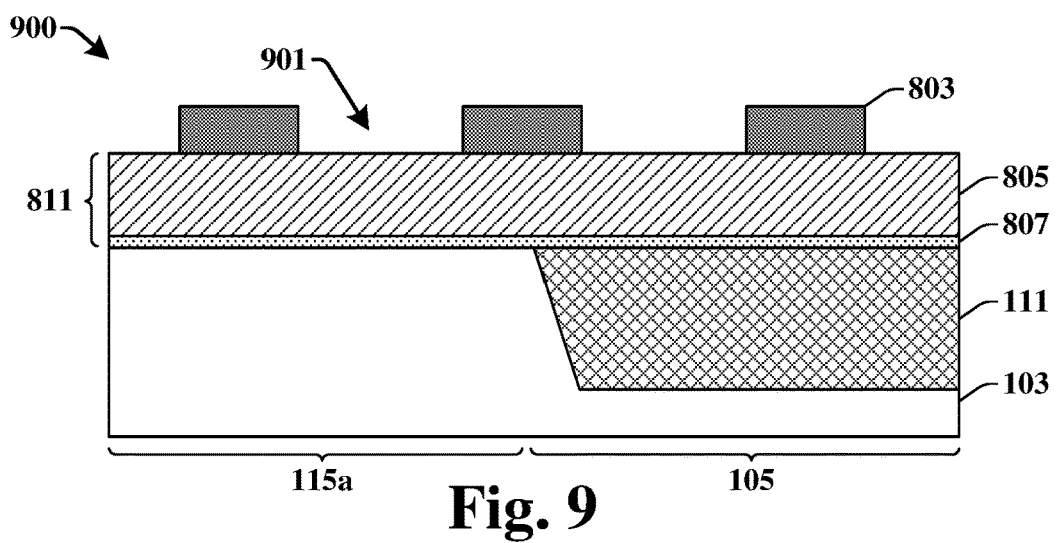

As shown by the cross-sectional view 900 of FIG. 9, an etching process may be carried out to selectively pattern the hard mask layer 803 according to the patterned mask 801 to form the openings 901. After patterning the hard mask layer 803, the patterned mask 801 may be stripped.

Figure 10:
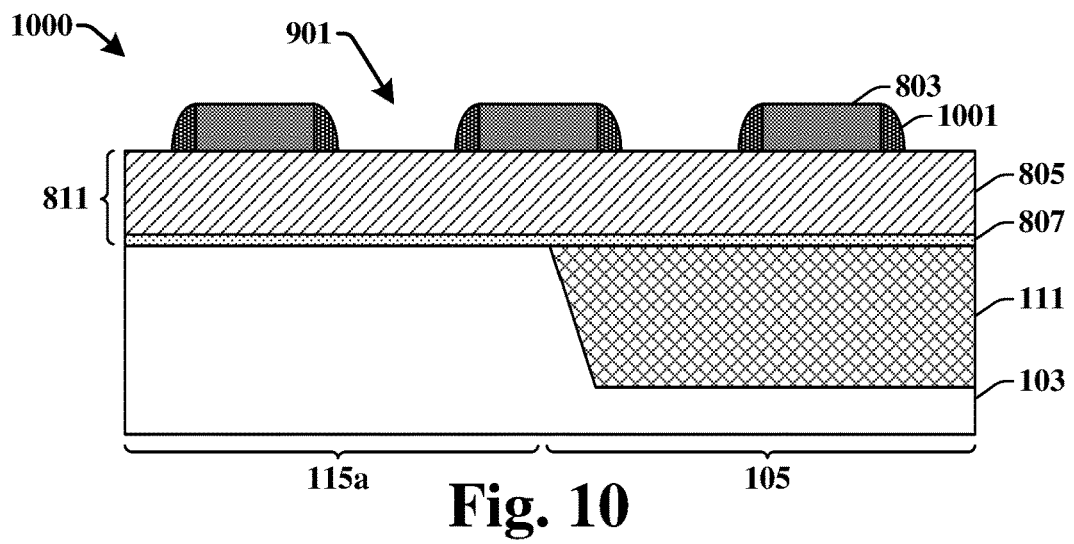

As shown by the cross-sectional view 1000 of FIG. 10, spacers 1001 may be formed to the sides of the openings 901 in the hard mask layer 803. Forming the spacers 1001 may include depositing a layer of spacer material and etching to leave only the material that forms the spacers 1001. The hard mask layer 803 may then be stripped.

Figure 11:
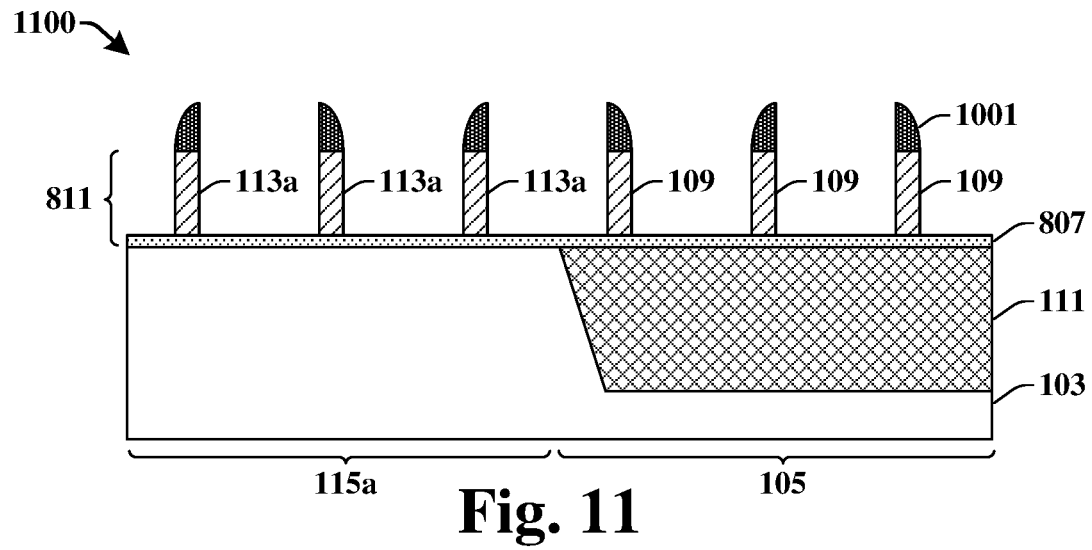
Figure 12:
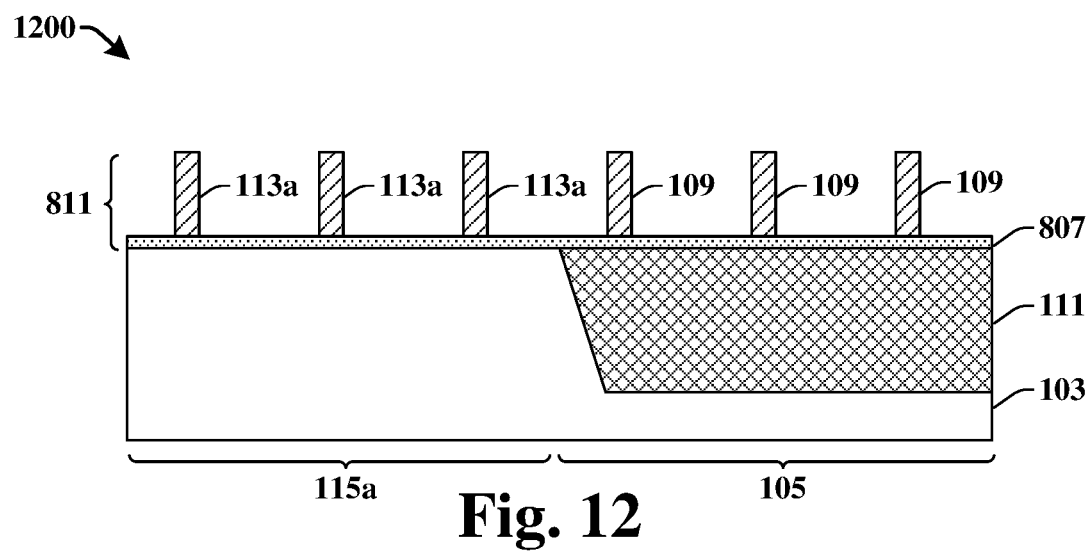

As shown by the cross-sectional view 1100 of FIG. 11, the polysilicon layer 805 may then be etched using the spacers 1001 to form linear features 113a in the active device area 115a and the linear features 109 in the dummy device area 105. As shown in FIG. 12, the spacers 1001 may then be stripped. The resulting linear features 113a and 109 may be more closely spaced than would be feasible using the photolithographic process alone.

Figure 13:
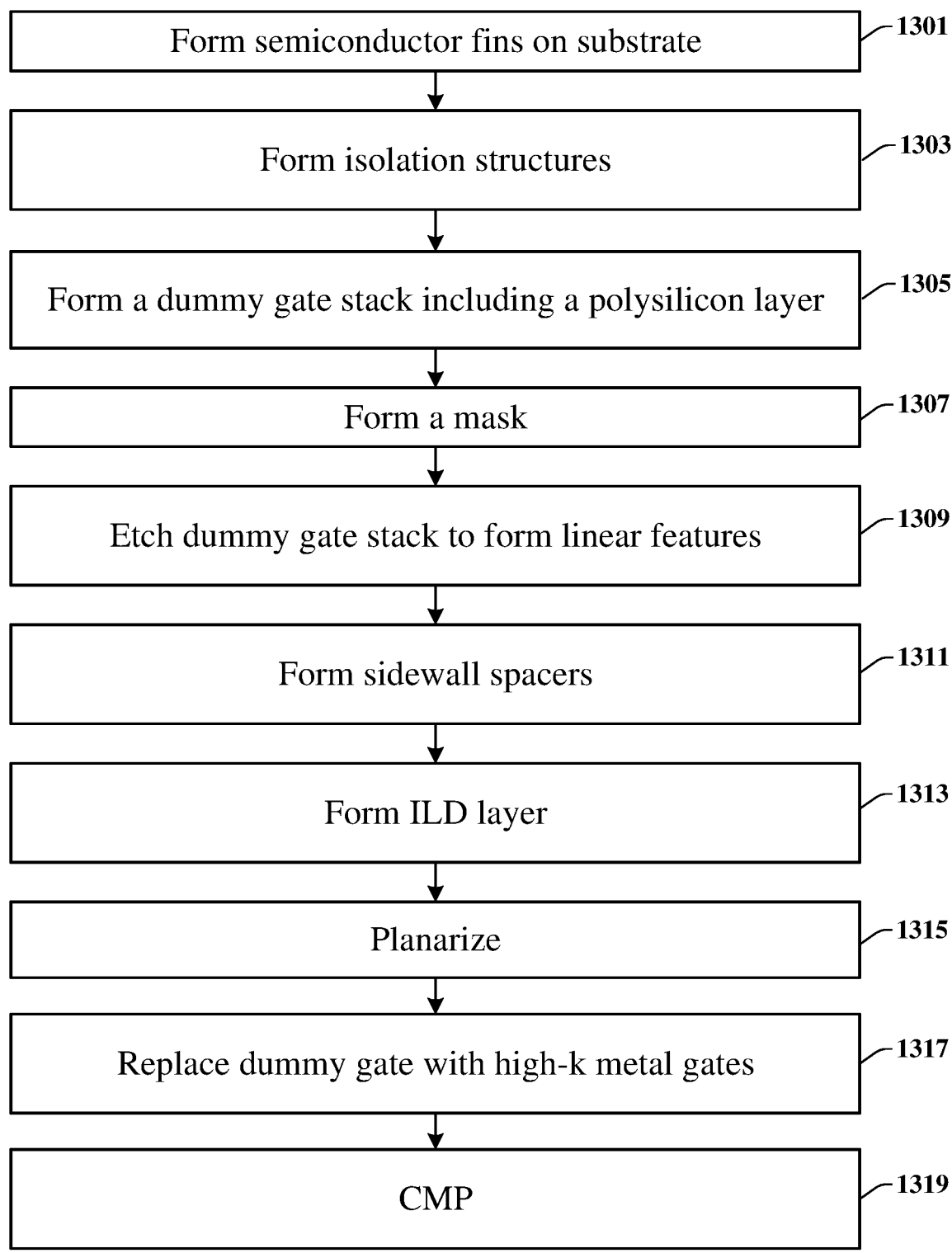
FIG. 13 provides a flow diagram of an example method of forming an integrated chip in accordance with some embodiments of the present disclosure

FIG. 13 provides a flow diagram of some embodiments of a method 1300 of forming an integrated chip with dummy device structures according to the present disclosure. While the method 1300 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Act 1301 is an optional step of forming semiconductor fins a semiconductor substrate. The method 1300 is intended to provide an example process in the 5 nm technology node and the 5 nm technology node typically uses finFETs.

Act 1303 is forming isolation structures. The isolation structures may define active device areas on the semiconductor substrate. FIG. 5 illustrates an example. In some embodiments, the isolation structures are shallow trench isolation regions.

Act 1305 is forming a dummy gate stack including a polysilicon layer. FIG. 5 provides an example. In some alternative embodiments, the gate stack is not a dummy gate stack but a gate stack with actual gate materials. In some other alternative embodiments the dummy gate stack uses another material in place of the polysilicon layer. Examples of other materials that might be used include metals, metal silicides, metal nitrides, or the like.

Act 1307 is forming a mask over the dummy gate stack. FIGS. 8-11 provide an example, wherein a double patterning process is used to form a mask composed of spacers 1001.

Act 1309 is using the mask of act 1307 to etch the gate stack and thereby form linear features. FIG. 12 provides an example. FIG. 6 provides another example. In accordance with the present teachings, these linear features include an array of linear features over an active device area and another array of linear features over a dummy device area, wherein the linear features in both arrays fall on one grid.

The remaining acts, acts 1311-1319, are a replacement gate process. The replacement gate process is optional. Also, a different replacement gate processes from the one illustrated and described here may be used in accordance with the present teachings.

Act 1311 is forming sidewall spacer adjacent linear features defined by act 1309. Act 1313 is depositing an inter-level dielectric (ILD) layer that fills remaining space between the linear features.

Act 1315 is a planarization process during which the dummy device structures formed by the linear features in the dummy device area may mitigate dishing in the active device area. The planarization process may be CMP.

Act 1317 is replacing the dummy gates with high-κ metal gates. The dummy gates are first removed to create openings that are subsequently filled with a high-κ metal gate stack. The metal of the high-κ metal gate stack, whether grown or deposited, is not initially limited to the opening created by removing the dummy gates. Accordingly, act 1317 may be followed act 1319, a CMP process in which the excess metal is removed. The linear features in the dummy device area may mitigate dishing in the active device area during this CMP process.

Some aspects of the present teachings relate to an integrated chip that includes a semiconductor substrate comprising an active device area and a dummy device area. A first plurality of poly lines is disposed on the active device area. A dummy device structure is disposed on the dummy device area. The dummy device structure includes a second plurality of poly lines that are on grid with the first plurality of poly lines.

Some aspects of the present teachings relate to an integrated chip that includes a semiconductor substrate having a first active device area, a second active device area, and a dummy device area that extends between the first active device area and the second active device area. A first array of linear features is disposed on the first active device area and has a first line spacing and a first line width. A second array of linear features is disposed on the second active device area and has a second line spacing and a second line width. A dummy device structure is disposed on the dummy device area and extends over a substantial portion of the dummy device area. According to these teachings, the dummy device structure is a third array of linear features having the first line spacing and the first line width.

Some aspects of the present teachings relate to a method of designing an integrated chip. The method includes generating an integrated circuit layout file including an oxide definition mask, wherein the oxide definition mask defines active device areas including a first active device area. A first array of linear features is added to the integrated circuit layout file, wherein the first array of linear features extends over the first active device area. Dummy fill is then inserted into the integrated circuit layout file. The dummy fill is outside the active device areas and includes a second array of linear features. The second array of linear features has a same pitch as the first array of linear features and is on grid with the first array of linear features.

Some aspects of the present teachings relate to a method of manufacturing an integrated chip that includes forming isolation structures on a semiconductor substrate to define a plurality of active device areas separated by a dummy device area, the dummy device area being that portion of the semiconductor substrate that is outside the active device areas. A continuous array of poly lines is formed on the semiconductor structure. A first portion of the continuous array of poly lines extends over one of the plurality of active devices and a second portion of the continuous array of poly lines extends over the dummy device areas The second portion is a substantial portion of the continuous array of poly lines. Active device connections are formed from the first portion of the continuous array of poly lines. A dummy device structure is formed from the second portion of the continuous array of poly lines. In some embodiments, forming the dummy device structure comprises etching to form breaks in a portion of the poly lines to divide them into segments having active device connections and segments forming parts of the dummy device structure. In some embodiments, forming the continuous array of poly lines comprises double patterning.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of designing an integrated chip, the method comprising:
   generating an integrated circuit layout file comprising an oxide definition mask, wherein the oxide definition mask specifies an isolation structure that surrounds and thereby defines each of a first active device area and a second active device area, wherein the isolation structure is specified to extend across a space between the first active device area and the second active device area;
   adding specifications for linear features in an array to the integrated circuit layout file, wherein the first linear features in the array have a constant pitch and extend over the first active device area, the second active device area, and the space between the first active device area and the second active device area; and
   operating a manufacturing process according to the integrated circuit layout file, wherein the manufacturing process includes:
   providing a semiconductor substrate;
   forming an isolation structure on the semiconductor substrate in a pattern determined by the integrated circuit layout file, whereby the isolation structure provides borders that define the first active device area and the second active device area on the semiconductor substrate; and
   forming the linear features on the semiconductor substrate according to the specification in the integrated circuit layout file, whereby the linear features form an array having constant pitch and extending across the first active device area, the second active device area, and the space between the first active device area and the second active device area wherein the linear features become integrated into active devices in the first active device area and in the second active device area and provide dummy devices in the space between the first active device area and the second active device area.

2. The method of claim 1, wherein the first linear features are spaced apart in a direction from the first active device area to the second active device area.

3. The method of claim 2, wherein at least eight of linear features are between the first active device area and the second active device area is at least eight times the pitch.

4. The method of claim 2, further comprising:
   inserting specifications for a metal interconnect structure into the integrated circuit layout file;
   wherein the manufacturing process includes forming the metal interconnect structure in accordance with the specification in the integrated circuit layout file; and
   the metal interconnect structure forms connection with the linear features in the first active device area and in the second device area but does not form connections with the linear features in the space between the first active device area and the second active device area.

5. The method of claim 1, wherein the linear features extend in a direction from the first active device area to the second active device area and are etched so that first portions of the linear features which are in the first active device area and in the second active device area are separated from second portions of the linear features which are in the space between the first active device area and the second active device area.

6. The method of claim 5, further comprising:
   inserting specifications for a metal interconnect structure into the integrated circuit layout file;
   wherein the manufacturing process includes forming the metal interconnect structure in accordance with the specification in the integrated circuit layout file; and
   the metal interconnect structure forms connection with the first portions of the linear features but does not form connections with the second portions of the linear features.

7. The method of claim 1, wherein the first active device area has four sides that form a perimeter, and the array comprises linear features beyond the perimeter on all four sides.

8. A computer-aided design process for forming an integrated chip, the process comprising:
generating an integrated circuit layout file comprising an oxide definition mask, wherein the oxide definition mask defines active device areas including a first active device area and a second active device area;
defining a shallow trench isolation structure, wherein the shallow trench isolation structure spans a distance between the first active device area and the second active device area and surrounds the first active device area and the second active device area so as to establish boundaries of the first active device area and the second active device area;
adding a first array of linear features to the integrated circuit layout file, wherein the first array of linear features extends over the first active device area;
adding a third array of linear features to the integrated circuit layout file, wherein the third array of linear features extends over the second active device area and is on grid with the first array of linear features;
inserting dummy fill into the integrated circuit layout file, wherein the dummy fill is directly over the shallow trench isolation structure and extends between the first active device area and the second active device area;
wherein the dummy fill is outside the active device areas;
the dummy fill comprises a second array of linear features, wherein the second array of linear features is on gird with the first array of linear features and the third array of linear features, whereby the first array of linear features, the second array of linear features, and the third array of linear features all have a pitch which is the same and fall on a grid having the pitch;
the integrated circuit layout file specifies a first mask for patterning the shallow trench isolation structure; and
the integrated circuit layout file specifies a second mask for simultaneously patterning the first array of linear features, the second array of linear features, and the third array of linear features.

9. The process of claim 8, wherein:
a first portion of the linear features in the second array are side-by-side with linear features of the first array; and
a second portion of the linear features in the second array are end-to-end with linear features of the first array.

10. The process of claim 8, wherein the distance between the first active device area and the second active device area is at least eight times the pitch.

11. The process of claim 8, wherein the dummy fill is on all sides of the first active device area.

12. The process of claim 8, the process further comprising inserting specifications for a metal interconnect structure into the integrated circuit layout file, wherein the specifications for a metal interconnect structure include making connections to the first array of linear features and the third array of linear features, but do not include making connections to the second array of linear features.

13. The process of claim 8, wherein the first array of linear features, the second array of linear features, and the third array of linear features form one large array of linear features having the pitch.

14. A method of integrated circuit design, the method comprising:
inserting into an integrated circuit layout file specifications for the locations of a first active device area and of a second active device area;
inserting into the integrated circuit layout file specifications for an isolation structure, wherein the isolation structure surrounds the first active device area, surrounds the second active device area, and extends across a dummy device region from the first active device area to the second active device area;
inserting into the integrated circuit layout file specifications for a first array of linear features, wherein the first array of linear features which are in the first active device area and the first array of linear features has a pitch;
specifying a grid having the pitch, wherein the first array of linear features are on the grid;
inserting into the integrated circuit layout file specifications for a second array of linear features, wherein the second array of linear features are in the second active device area and are on the grid;
inserting specifications for dummy fill into the integrated circuit layout file, wherein the dummy fill comprises a third array of linear features that are on the grid and are between the first active device area and the second active device area;
inserting specifications for a metal interconnect into the integrated circuit layout file, wherein the metal interconnect includes connections to the first array of linear features and connections to the second array of linear features but no connections to the third array of linear features.

15. The method of claim 14, wherein the linear features in the third array are side-by-side with the linear features in the second array.

16. The method of claim 14, wherein the linear features in the third array are end-to-end with the linear features in the second array.

17. The method of claim 14, wherein each of the first array of linear features, the second array of linear features, and the third array of linear features comprise even numbers of linear features.

18. The method of claim 14, wherein:
a first portion of the linear features in the third array are side-by-side with linear features of the second array; and
a second portion of the linear features in the third array are end-to-end with linear features of the second array.

19. The method of claim 14, where a ratio of line width to line spacing in the first array of linear features is in the range from 0.10 to 0.20.

20. The method of claim 14, where a ratio of line width to line spacing in the first array of linear features is in the range from 0.12 to 0.14.

* * * * *